Aug. 19, 1930.  H. O. HEM  1,773,358
WEIGHING SCALE
Filed April 11, 1928  2 Sheets-Sheet 2
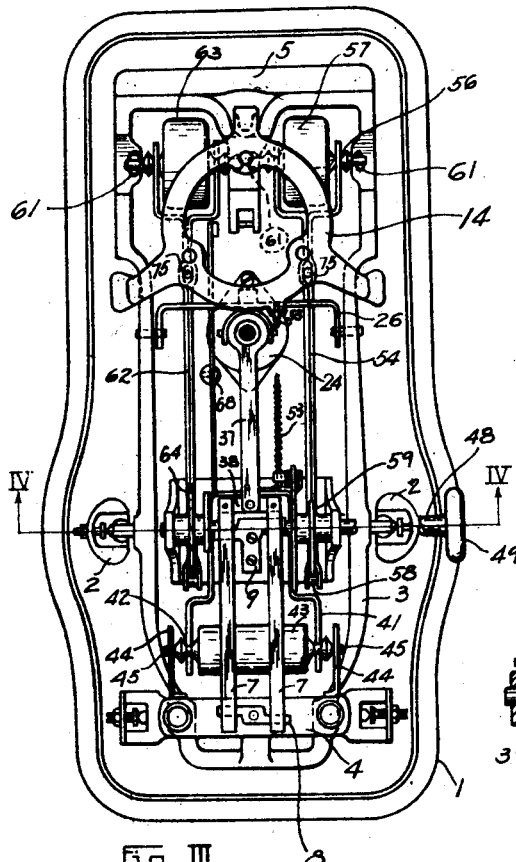
Inventor
HALVOR O. HEM
By C. D. Marshall
Attorney Patented Aug. 19, 1930

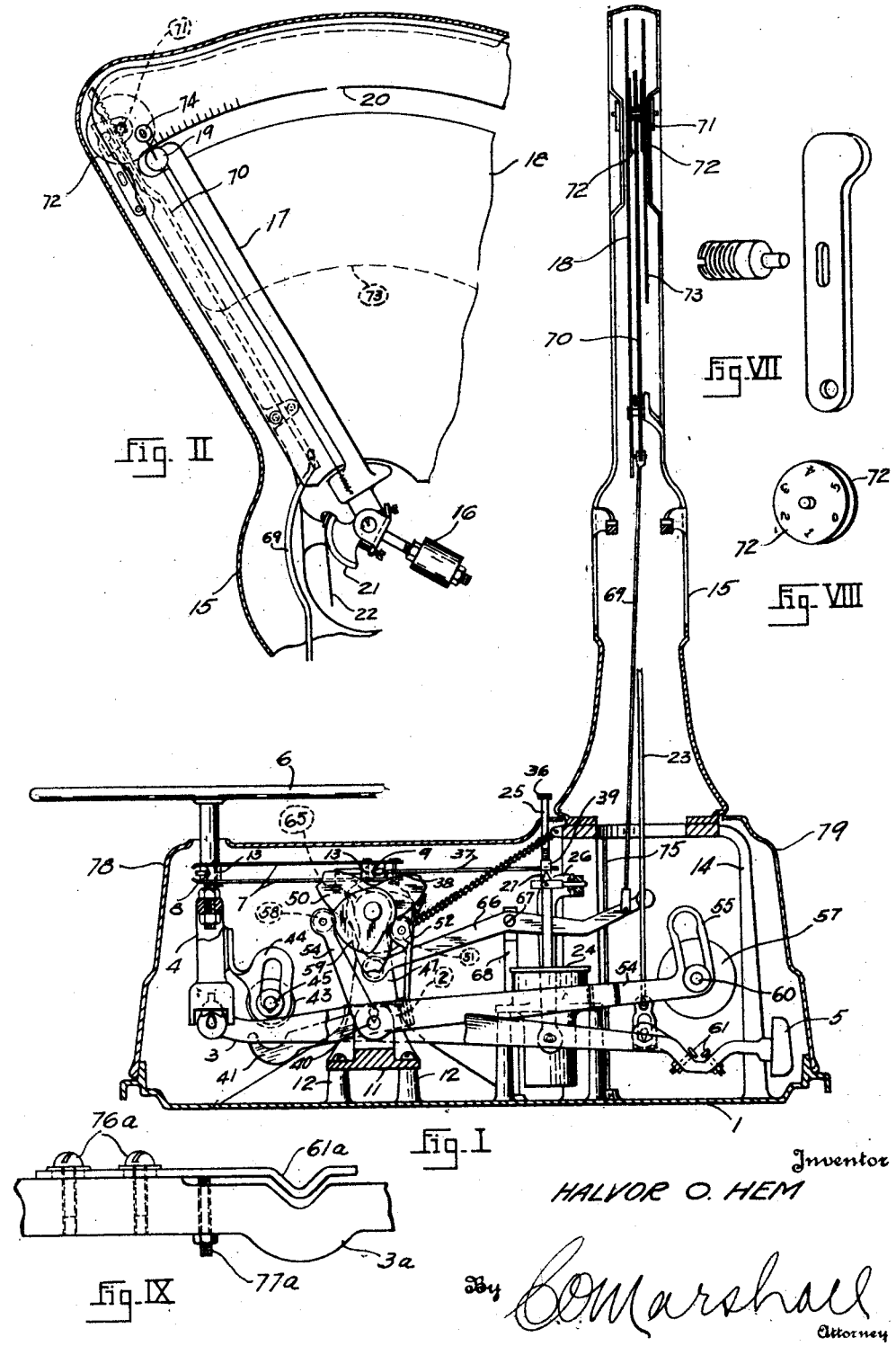

1,773,358

UNITED STATES PATENT OFFICE

HALVOR O. HEM, OF TOLEDO, OHIO, ASSIGNOR TO TOLEDO SCALE COMPANY, OF TOLEDO, OHIO, A CORPORATION OF NEW JERSEY

WEIGHING SCALE

Application filed April 11, 1928. Serial No. 269,213.

This invention relates to weighing scales, and particularly to weighing scales intended for use in retail shops.

One of the principal objects of the invention is the provision of means whereby a small number of unit weights, such, for example, as three, may be used to obtain a larger number of capacity changes in a scale of the semi-automatic type.

Another object is the provision of means whereby unit weights and manipulating mechanism therefor are so disposed within a scale base as to utilize to the best advantage the space available therein.

Another object is the provision of means whereby one or more unit weights are deposited upon the platform spider, thereby avoiding the necessity for providing additional accurate positioning devices for locating such weights on the lever.

Another object of the invention is to provide a series of unit weights and apparatus for shifting such unit weights individually or in combination onto and off from the lever mechansm of the scale.

Another object is to provide means whereby the effort of lifting some of the mass of such unit weights in raising them from the weighing lever is furnished in part by the descending weight of another of said unit weights.

Another object is to provide unit weights adapted to be brought into action on both sides of the fulcrum of the lever of the weighing mechanism.

Another object is to provide means for manipulating such weights with a minimum of effort and a minimum of shock.

Another object is to provide manipulating mechanism which will not hold such weights in intermediate position and will either hold them entirely free of the weighing mechanism of the scale or deposit them upon such weighing mechanism so as to be free from engagement or interference with the manipulative mechanism.

Another object of the invention is the provision of improved frictionless means for preventing the scale platform from tipping during weighing operations.

Another object is the provision of improved means for connecting a dash pot to a scale lever and conserving the vertical space required for such connection.

Another object is the provision of improved means for indicating the counterbalancing effect of the unit weights.

Still another object is the provision of an improved weight and money value chart, and index.

Other objects and advantages will be apparent from the following description, in which reference is had to the accompanying drawings illustrating a preferred embodiment of my invention and wherein similar reference numerals designate similar parts throughout the several views.

Referring to the accompanying drawings:—

Figure I is a side elevational view, with parts broken away and parts in section, showing the assembled mechanism of a scale embodying the invention;

Figure II is a fragmentary front elevational view showing the automatic load-counterbalance and indicator;

Figure III is a plan view of the lever mechanism of the scale, parts being broken away;

Figure IV is a sectional view taken substantially on the line IV—IV of Figure III, parts being shown in elevation;

Figure V is an enlarged detail view showing the dash pot and its yoke connection to the platform lever, parts being broken away and parts shown in section;

Figure VI is an enlarged detail plan view showing a joint and yoke used to connect the dash pot and lever;

Figure VII is an enlarged detail perspective view of elements of a rack retaining device;

Figure VIII is an enlarged detail perspective showing an indicating element; and Figure IX is an enlarged fragmentary detail showing a modified form of unit weight receiver.

Referring to the drawings in detail, the base 1 of the scale is a casting, integral with which are fulcrumed stands 2, upon which is pivoted the main platform lever 3.

The platform lever 3 is of the first order, carrying a platform supporting frame or spider 4 at one of its ends and at its other end a counterweight 5 which normally holds the platform spider 4 and platform 6 in elevated position. The platform spider and platform are prevented from tilting during weighing operations by means of check links 7, which are pivoted at one end to the platform spider, as at 8, directly above the load pivot of the lever 3, the other ends of the links being pivoted, as at 9, to an upwardly extending arm 10 of a frame 11 which is secured upon bosses 12 formed upon the upper side of the base.

The check link 7 consists of two pairs of flat bars, each pair having bearing blocks 13 mounted at its ends which engage the pivots 8 and 9, one pair of which forms a push connection, the other pair forming a pull connection.

Integral with the base and rising from the rear end thereof is a three-legged stand 14, upon which is secured an upright fan-shaped housing 15 that encloses and supports a load-counterbalancing pendulum 16, to which is secured an indicating hand 17 that swings over a chart 18 bearing weight graduations and adapted to bear price computations. At the upper end of the hand 17 is a small colored disk 19 having a radial line adapted to co-operate with the series of weight graduations ranged along the upper side of a slot 20 in the chart 18, within which slot the small disk 19 moves as the hand 17 swings from side to side. Rigidly secured to the pendulum 16 is a slightly eccentric sector 21. A flexible metallic ribbon 22 overlies the sector 21, its upper end being secured thereto, its lower end being secured to a substantially vertically hanging draft rod 23, the lower end of which is in turn pivoted to the rear end of the platform lever 3.

The counterweight 5 is of sufficient mass to hold the platform 6 in elevated position when the scale is not under load and also, acting through the draft rod 23 and ribbon 22, to swing the pendulum 16 upwardly and to the right to a position in which the line on the small disk 19 of the indicator hand 17 will register with the first graduation on the chart. When, however, a load is placed upon the platform 6, a part of the mass of the counterweight 5 is counterbalanced. The pull on the draft rod 23 is thus to some extent relieved and the pendulum 16 is permitted to descend to a position in which the lever and pendulum and their supported parts are again in balance.

In order to prevent sudden movements of the automatic weighing mechanism and to protect the ribbon 22 and the bearings of the pendulum 16 from shocks when heavy loads are thrown upon or suddenly removed from the platform 6, a dash pot 24 is mounted on the base 1 and connected by means of a plunger rod 25 and a pivoted yoke 26 to the lever 3. Provision of the yoke 26 makes its possible to mount the dash pot at about the same level as its pivotal connection with the lever 3.

The dash pot plunger rod 25 is pivoted to the yoke 26 by means of a threaded member 27 which is pivoted by means of studs 28 to a ring 29, the ring 29 being in turn pivoted to the arms of a fork 30 the shank of which is swiveled in a boss 31 on the bight of the yoke 26.

The plunger rod 25 carries at its lower end a plunger 32. Immediately above the plunger 32 and surrounding the plunger rod 25 is an expansive coil 33 which presses upwardly against a bell 34 and through the bell 34 against a sleeve 35 also surrounding the plunger rod 25. The upper end of the sleeve 35 engages the member 27 through which the plunger rod is threaded. The upper end of the rod 25 is provided with a knurled knob 36 by means of which the rod may be turned to draw the plunger 32 toward the bell 34, thus restricting the passage of fluid through ports in the plunger. The damping effect of the dash pot may thus be adjusted to compensate for changes in temperature.

Since the dash pot plunger is not suspended from the lever but is connected to an upwardly extending yoke, the dash pot plunger and yoke have a tendency to fall over, and this tendency is counteracted by a link 37 pivoted to cross-member 38 connecting the check links 7. The link 37 has a knife-edged opening surrounding a hardened tube 39 on the upper part of the dash pot plunger 25 and the end of the link 37 adjacent the plunger rod rests on knife edges formed on the member 27. The load pivot and fulcrum pivot of the lever 3 and the pivotal connection between the yoke 23 and the lever 3 are in substantially a straight line which is parallel with the link 7 and the link 37, so that the points of pivotal connection of the link and the lever with the platform spider, the stationary frame of the scale and the dash pot plunger form a parallelogram in all weighing positions of the parts.

The mechanism so far described will automatically indicate the weight of any commodity within the automatic capacity of the scale which is placed upon the platform. In order to increase the capacity of the scale without reducing the movement of the indicator hand per unit of weight, I have provided manipulative load-counterbalancing mechanism which is supported by the frame 11.

Extending through the frame 11 with its axis coinciding with the axis of the fulcrum pivots of the lever 3 is a fixed shaft 40 upon which is rockably mounted a forked bell crank lever 41, the forks of which extend toward the platform spider 4 and are provided with notched extremities adapted to engage axial trunnions 42 on a cylindrical unit weight 43.

When the forks of the lever 41 are swung upwardly, they lift the unit weight 43 from the spider 4 upon which it is normally supported by means of a pair of ears 44 having elongated arcuate slots the lower ends of which receive extensions 45 on the trunnions 42. In the scale illustrated the mass of the unit weight 43 is equal to the automatic capacity of the scale, preferably one kilogram. When it is lifted by the forks of the bell crank lever 41 the trunnion extensions 45 are positioned within the arcuate slots of the ears 44, entirely out of engagement therewith, so that the effect of lifting the weight 43 is the same as would be the effect of removing an equal weight from the platform 6.

The frame 11 includes the upstanding arm 10 and two additional upstanding arms 46 and 47, in the upper ends of which is journaled a revoluble hand wheel shaft 48 provided with a hand wheel 49, by means of which the unit weight depositing mechanism is operated. Fixed upon the hand wheel shaft 48 is a three-lobed cam 50 which engages a roller 51 mounted on an upright arm 52 of the bell crank lever 41. The ends of the lobes of the cam 50 are notched, as is apparent in Figure I, to receive the roller 51 on the end of the upright arm 52 of the bell crank lever 41 when the bell crank lever has been swung to lift the unit weight 43 from the platform spider 4. When the three-lobed cam 50 is turned to permit the roller on the bell crank lever to ride into the depression between the lobes, the unit weight 43 is redeposited upon the platform spider 4. In order to reliably hold the bell crank lever 41 in such position that its fork arms will remain out of engagement with the trunnions 42 at the lowermost position of the platform spider 4, I have interposed an expansive spring 53 between the upwardly extending arm 52 of the bell crank lever 41 and the top of the stand 14. In order to prevent buckling of the spring 53 it is telescoped over a rod. The arrangement of the expansive spring 53 and bell crank lever 41 is such that the spring has the advantage of leverage when it is most expanded. It is believed to be evident that by turning the hand wheel 49 through one revolution the unit weight 43 may be lifted from and relowered upon the platform spider 4 three times.

The fixed shaft 40 which extends through the frame 11 in alignment with the fulcrum axis of the lever 3 also pivotally supports a bell crank lever 54 which has an arm extending horizontally rearwardly and terminating in a pair of ears 55 having elongated arcuate slots the lower ends of which are adapted to engage trunnions 56 on a cylindrical unit weight 57. When, however, the hand wheel 49 is turned sufficiently to permit a roller 58 on the upright arm of the bell crank lever 54 to ride inwardly on a cam 59 fixed to the hand wheel shaft, the unit weight 57 is lowered until extensions 60 come into engagement with the upper faces of screws 61.

The unit weight 57 weighs approximately the same as the unit weight 43, but when it is supported by the screws 61 on the lever 3, its distance from the fulcrum of the lever 3 is approximately twice as great as the distance from the fulcrum of the load pivots supporting the spider 4. Consequently, depositing the weight 57 on the lever 3 has a capacity increasing effect double that resulting from the removal of the unit weight 43 from the platform spider 4. The position of the unit weight 57 upon the lever 3 may be adjusted both vertically and horizontally by screwing in or backing out one or both of the screws 61 on each side of the weight. If it is desired to raise the weight, both screws are backed out. If it is desired to move the weight horizontally, one of the screws is backed out and the other is screwed in.

A third bell crank lever 62 is also pivoted on the shaft 40 which is fixed in the frame 11 co-axially with the fulcrum of the lever 3. This bell crank lever 62 is substantially identical in form with the bell crank lever 54 just described and serves to lift and deposit a unit weight 63 which is identical in all respects with unit weight 57. The bell crank lever 62 is operated, however, by a cam 64 having an exterior arcuate surface extending through somewhat more than 180 degrees and the unit weight 63, therefore, will remain off the lever 3 during one-half a revolution of the hand wheel 49.

In order to provide a conspicuous and infallible indication to both the operator of the scale and his customer of the counterbalancing effect of the unit weights 43, 57 and 63, the hand wheel shaft 48 is provided with a stepped spiral cam 65 which engages one end of a lever 66 fulcrumed at 67 on a post 68 rising from the base 1. The lever 66 is connected at its rear end to a longitudinally reciprocating rod 69 which extends upwardly along the left side of the upright chart housing 15 and is equipped at its upper end with a rack 70 that operates a pinion 71 and thereby turns a pinion shaft upon which are mounted two disks 72 lying between the front chart 18 and a back chart 73 and bearing the figures 0, 1, 2, 3, 4 and 5. These figures 0, 1, 2, 3, 4 and 5 appear successively at an opening 74 in the chart 18 and indicate whether the position of the unit weights is such as to counterbalance nothing or one, two, three, four or five kilograms of load.

Lateral displacement of the bell crank levers 54 and 62 is prevented by vertical guide rods 75 which are fixed to the base and the stand 15 and pass through loops in the bell crank levers 54 and 62.

If a load of one-half kilogram is placed on the platform 6, the pendulum 16 is permitted to swing downwardly far enough so that a proportionate amount of the pull on the ribbon 22 and draft rod 23 is relieved. The scale in this operation, and in all operations in which the load weighed is one kilogram or less, is fully automatic.

In order to increase the capacity of the scale sufficiently to make it capable of weighing a load of between one and two kilograms, the hand wheel 49 is turned through one-sixth of a revolution, the unit weight 43 being lifted from the platform spider 4 by movement of the bell crank lever 41 as its roller rides outwardly into the notch on the first lobe of the cam 50.

When a load of between two and three kilograms is upon the platform and the hand wheel is turned through another one-sixth revolution, the unit weight 43 is redeposited on the platform spider by movement of its bell crank lever as the roller on the lever moves into the depression between the first and second lobes of the three-lobed cam and the unit weight 57 is deposited on the lever as the roller 58 on its bell crank moves down the side of the cam 59 toward the hand wheel shaft. Owing to the fact that the distance of the unit weight 57 from the lever fulcrum is twice as great as the distance of the load pivot, which supports the platform, from the lever fulcrum, the unit weight 57 counterbalances two kilograms on the platform.

When the load upon the platform is increased to between three and four kilograms, the unit weight 57 remains on the lever and the unit weight 43 is again lifted from the platform spider by turning the hand wheel through another one-sixth revolution, thus swinging the bell crank lever 41 by means of the second lobe of the cam 50.

When the load on the platform is increased to four and a fraction kilograms, the unit weight 57 remains upon the lever and the unit weight 63 is also lowered onto the lever as the roller on its bell crank 62 moves down the side of the cam 64 toward the hand wheel shaft, but the unit weight 43 is redeposited on the platform spider as the roller 51 on its bell crank lever 41 moves into the depression between the second and third lobes of the cam 50, neutralizing half the effect of the deposit of the unit weight 63.

When a load of five and a fraction kilograms has been placed on the platform, the unit weights 57 and 63 remain upon the lever, but the unit weight 43 is lifted from the spider as the roller 51 on its bell crank 41 moves outwardly into the notch on the third lobe of the cam 50 during another one-sixth turn of the hand wheel. The scale is thus given its maximum capacity.

In changing the capacity of the scale as above set forth, the hand wheel 49 has been turned through one-sixth revolution for each change and the figure in the opening 74 has been changed to indicate in each instance the changed counterbalancing effect of the unit weights.

An additional one-sixth turn of the hand wheel again turns the cams 59 and 64 beneath the rollers of the bell cranks which lift the unit weights 57 and 63 from the lever and at the same time turns the third lobe of the cam 50 from under the roller of the bell crank lever 41, thus lowering the weight 43 onto the platform spider. The mechanism is thus returned to the condition in which it is adapted to automatically weigh small drafts.

During the last one-sixth turn of the hand wheel both the unit weights 57 and 63 are lifted, but the effort required to lift these two unit weights is minimized by the fact that the unit weight 43 as it swings downwardly and the expansion of the expansive spring 53 help to turn the hand wheel shaft through this last one-sixth revolution.

The fact that the unit weight 43 is raised and the spring 53 is compressed as each of the unit weights 57 and 63 is dropped upon the lever tends to prevent the shock to which the mechanism would be subject if these weights were dropped without any compensating elevation of another weight and to enable the manipulating mechanism to be smoothly, gently and easily operated.

In order to absorb any shock that may result from careless or intentional violent movement of the hand wheel 49, the connection from the ears 44 to the spider 4 is made in such form as to be resilient and Figure IX shows a modification in which the seat upon the rear end of the lever 3ᵃ is in the form of a resilient strip 61ᵃ. The strip 61ᵃ is secured to the lever 3ᵃ by screws 76ᵃ which pass through slots in the strip that permit its longitudinal adjustment when the screws 76ᵃ are loosened. Vertical adjustment of the resilient strip is obtained by means of a screw 77ᵃ.

The base mechanism of the scale is enclosed by a removable housing consisting of two sections 78 and 79, which, since they support none of the working parts, may be made of light material. The mechanism may be completely assembled and adjusted before it is enclosed by the housing sections 78 and 79.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, lever mechanism, a unit weight normally deposited thereon, means for lifting said unit weight therefrom, a second unit weight, means for simultaneously redepositing the first said unit weight and depositing said second unit weight on said lever mechanism in opposition to the first said unit weight, and means for again lifting the first said unit weight from said lever mechanism, said second unit weight having twice the counterbalancing effect of the first said unit weight.

2. In a weighing scale, in combination, lever mechanism, a unit weight normally deposited upon said lever mechanism, a plurality of additional unit weights, means for successively depositing said additional unit weights on said lever mechanism in opposition to the first said unit weight, means for lifting the first said unit weight from said lever mechanism, and means for redepositing the first said unit weight on said lever mechanism simultaneously with the deposit of each of said additional unit weights.

3. In a weighing scale, in combination, lever mechanism, a unit weight normally deposited upon said lever mechanism, a plurality of additional unit weights, means for successively depositing said additional unit weights on said lever mechanism in opposition to the first said unit weight, means for lifting the first said unit weight from said lever mechanism, means for redepositing the first said unit weight on said lever mechanism simultaneously with the deposit of each of said additional unit weights, and additional lifting means for lifting the first said unit weight from said lever mechanism between deposits thereon of said additional unit weights.

4. In a weighing scale, in combination, lever mechanism, a unit weight normally deposited upon said lever mechanism, a plurality of additional unit weights, means for successively depositing said additional unit weights on said lever mechanism in opposition to the first said unit weight, means for lifting the first said unit weight from said lever mechanism, means for redepositing the first said unit weight on said lever mechanism simultaneously with the deposit of each of said additional unit weights, and additional lifting means for lifting the first said unit weight from said lever mechanism between deposits thereon of said additional unit weights, the counterbalancing effect of each of said additional unit weights being twice the counterbalancing effect of the first said unit weight.

5. In a weighing scale, in combination, a lever, unit weights, and means for simultaneously depositing said unit weights upon said lever in opposition to each other, one of said unit weights having greater counterbalancing effect than a unit weight deposited in opposition thereto upon said lever.

6. In a weighing scale, in combination, a lever, a unit weight normally deposited thereon, means for lifting said unit weight therefrom, a second unit weight, and means for simultaneously redepositing the first said unit weight and depositing said second unit weight on said lever in opposition to the first said unit weight.

7. In a weighing scale, in combination, a lever, a unit weight normally deposited thereon, means for lifting said unit weight therefrom, a second unit weight, and means for simultaneously redepositing the first said unit weight and depositing said second unit weight on said lever in opposition to the first said unit weight, said second unit weight having twice the counterbalancing effect of the first said unit weight.

8. In a weighing scale, in combination, a lever, a unit weight normally deposited thereon, means for lifting said unit weight thereweight and depositing said second unit ht from, a second unit weight, means for simultaneously redepositing the first said unit weight and depositing said second unit weight on said lever in opposition to the first said unit weight, and means for again lifting the first said unit weight from said lever.

9. In a weighing scale, in combination, a lever, a platform support pivotally mounted on said lever, a unit weight normally deposited on said platform support, means for lifting said unit weight therefrom, a second unit weight, and means for depositing said second unit weight on said lever on the opposite side of the lever fulcrum from said platform support.

10. In a weighing scale, in combination, a lever, a platform support pivotally mounted on said lever, a unit weight normally deposited on said platform support, means for lifting said unit weight therefrom, a second unit weight, and means for depositing said second unit weight on said lever on the opposite side of the lever fulcrum from said platform support, said second unit weight having a greater counterbalancing effect than the first said unit weight.

11. In a weighing scale, in combination, a lever, a platform support pivotally mounted on said lever, a unit weight normally deposited on said platform support, means for lifting said unit weight therefrom, a second unit weight, means for depositing said second unit weight on said lever on the opposite side of the lever fulcrum from said platform support, and means for redepositing the first said unit weight on said platform support simultaneously with the deposit on said lever of said second unit weight.

12. In a weighing scale, in combination, a lever, a platform support pivotally mounted on said lever, a unit weight normally deposited on said platform support, means for lifting said unit weight therefrom, a second unit weight, means for depositing said second unit weight on said lever on the opposite side of the lever fulcrum from said platform support, means for redepositing the first said unit weight on said platform support simultaneously with the deposit on said lever of said second unit weight, and means for subsequently lifting the first said unit weight from said platform support.

13. In a weighing scale, in combination, a lever, a platform support pivotally mounted on said lever, a unit weight normally deposited on said platform support, means for lifting said unit weight therefrom, a second unit weight, means for depositing said second unit weight on said lever on the opposite side of the lever fulcrum from said platform support, means for redepositing the first said unit weight on said platform support simultaneously with the deposit on said lever of said second unit weight, and means for subsequently lifting the first said unit weight from said platform support, said second unit weight having twice the counterbalancing effect of the first said unit weight.

14. In a weighing scale, in combination, a lever, a platform support pivotally mounted on said lever, a unit weight normally deposited on said platform support, means for lifting said unit weight therefrom, a second unit weight, means for depositing said second unit weight on said lever on the opposite side of the lever fulcrum from said platform support, means for redepositing the first said unit weight on said platform support simultaneously with the deposit on said lever of said second unit weight, and means for subsequently lifting the first said unit weight from said platform support, said unit weights having substantialy the same mass, said second unit weight when deposited on said lever being twice as far from the lever fulcrum as is the pivotal connection between said platform support and said lever.

15. In a weighing scale, in combination, a lever, a platform support pivotally mounted on said lever, a unit weight normally deposited on said platform support, means for lifting said unit weight therefrom, a plurality of additional unit weights, and means for depositing said additional unit weights successively on said lever on the side of its fulcrum opposite from the pivotal mounting of said platform support.

16. In a weighing scale, in combination, a lever, a platform support pivotally mounted on said lever, a unit weight normally deposited on said platform support, means for lifting said unit weight therefrom, a plurality of additional unit weights, and means for depositing said additional unit weights successively on said lever on the side of its fulcrum opposite from the pivotal mounting of said platform support, the counterbalancing effect of each of said additional unit weights being twice that of the first said unit weight.

17. In a weighing scale, in combination, a lever, a platform support pivotally mounted on said lever, a unit weight normally deposited on said platform support, means for lifting said unit weight therefrom, a plurality of additional unit weights, means for depositing said additional unit weights successively on said lever on the side of its fulcrum opposite from the pivotal mounting of said platform support, and means for redepositing the first said unit weight on said platform support simultaneously with the deposit of each of said additional unit weights.

18. In a weighing scale, in combination, a lever, a platform support pivotally mounted on said lever, a unit weight normally deposited on said platform support, means for lifting said unit weight therefrom, a plurality of additional unit weights, means for depositing said additional unit weights successively on said lever on the side of its fulcrum opposite from the pivotal mounting of said platform support, and means for redepositing the first said unit weight on said platform support simultaneously with the deposit of each of said additional unit weights, the counterbalancing effect of each of said additional unit weights being twice that of the first said unit weight.

19. In a weighing scale, in combination, a lever, a platform support pivotally mounted on said lever, a unit weight normally deposited on said platform support, means for lifting said unit weight therefrom, a plurality of additional unit weights, means for depositing said additional unit weights successively on said lever on the side of its fulcrum opposite from the pivotal mounting of said platform support, and means for redepositing the first said unit weight on said platform support simultaneously with the deposit of each of said additional unit weights and for lifting the first said unit weight between deposits of said additional unit weights.

20. In a weighing scale, in combination, a lever, a platform support pivotally mounted on said lever, a unit weight normally deposited on said platform support, means for lifting said unit weight therefrom, a plurality of additional unit weights, means for depositing said additional unit weights successively on said lever on the side of its fulcrum opposite from the pivotal mounting of said platform support, and means for redepositing the first said unit weight on said platform support simultaneously with the deposit of each of said additional unit weights and for lifting the first said unit weight between deposits of said additional unit weights, the counterbalancing effect of each of said additional unit weights being twice that of the first said unit weight.

21. In a weighing scale, in combination, lever mechanism, unit weights, and means for depositing said unit weights on said lever mechanism in opposition to each other, said depositing means comprising a bell crank lever for each of said unit weights and a cam shaft carrying a cam for each of said bell crank levers.

22. In a weighing scale, in combination, lever mechanism, a plurality of unit weights, means for successively depositing said unit weights on said lever mechanism including a cam shaft and cams, an opposing unit weight having half the counterbalancing effect of each of the first said unit weights, and means for depositing said opposing unit weight simultaneously with the deposit of each of the first said unit weights and for lifting said opposing unit weight between such deposits of the first said unit weights, said opposing unit weight lifting and depositing means including a multi-lobed cam.

23. In a weighing scale, in combination, a lever, a dash pot supported at about the level of said lever, a plunger located in said dash pot, and means connecting said lever to said plunger consisting of a yoke pivotally mounted on said lever and a pivotal joint between said yoke and said plunger.

24. In a weighing scale, in combination, a lever, a dash pot supported at about the level of said lever, a plunger located in said dash pot, and means connecting said lever to said plunger consisting of a yoke pivotally mounted on said lever and a universal joint between said yoke and said plunger.

25. In a weighing scale, in combination, a lever, a dash pot mounted at about the level of said lever, means connecting said dash pot and said lever comprising a yoke and a plunger pivotally connected to said yoke, and a check link connected to said plunger.

26. In a device of the class described, in combination, a lever, a threaded member pivotally connected to said lever, a plunger rod threaded through said threaded member, a plunger secured to said plunger rod, said plunger having openings therein for the passage of fluid, a flow controlling member overlying said openings, a sleeve surrounding said plunger rod and extending between said flow controlling member and said threaded member, and resilient means for forcing said flow controlling member away from said plunger and against said sleeve.

27. In a device of the class described, in combination, a lever, a threaded member pivotally connected to said lever, a plunger rod threaded through said threaded member, a plunger secured to said plunger rod, said plunger having openings therein for the passage of fluid, a flow controlling member overlying said openings, a sleeve surrounding said plunger rod and extending between said flow controlling member and said threaded member, and resilient means for forcing said flow controlling member away from said plunger and against said sleeve, said plunger rod extending above said threaded member and being provided with a handle.

28. In a weighing scale, in combination, a housing, a dash pot, a lever, a threaded member connected to said lever, a plunger rod threaded through said member, a plunger secured to said plunger rod and located within said dash pot, said plunger having perforations for the passage of fluid, a flow control member overlying said plunger, a sleeve surrounding said plunger rod and extending between said flow control member and said threaded member, and resilient means for forcing said flow control member away from said plunger and against said sleeve, said dash pot, lever and said threaded member being located within said housing, said plunger rod extending to the exterior of said housing.

HALVOR O. HEM.